United States Patent [19]

Seaman, Jr.

[11] 3,901,548

[45] Aug. 26, 1975

[54] SLIDABLE COVER ASSEMBLY FOR A PICKUP TRUCK

[76] Inventor: John A. Seaman, Jr., P.O. Box 141, McMinnville, Tenn. 37110

[22] Filed: May 31, 1974

[21] Appl. No.: 474,949

[52] U.S. Cl. .................. 296/10; 135/1 A; 296/100; 296/137 B
[51] Int. Cl.² .......................................... B60P 3/42
[58] Field of Search............ 296/10, 99, 100, 137 R, 296/137 B, 16; 308/3.6, 3.8; 49/425, 421; 135/1 A

[56] References Cited
UNITED STATES PATENTS

| | | | |
|---|---|---|---|
| 728,657 | 5/1903 | Beatty | 49/425 |
| 2,014,140 | 9/1935 | Larsen | 296/137 B |
| 3,649,063 | 3/1972 | Stark | 135/1 A |
| 3,773,380 | 11/1973 | Stockdill | 296/16 |

*Primary Examiner*—Robert J. Spar
*Assistant Examiner*—Gary Auton
*Attorney, Agent, or Firm*—Berman, Bishoff & Platt

[57] ABSTRACT

A slidable cover assembly for a pickup truck of the type having a body with side walls and an end wall, the side walls having outwardly extending top flanges. The cover assembly consists of a frame on which is attached a flexible covering. The longitudinal bottom edges of the frame are provided with longitudinal horizontal plates, to the outer bottom margins of which are secured outwardly facing channels. Secured to the horizontal plates inwardly adjacent to the channels are a plurality of spaced depending ball bearing assemblies engaging on the side wall top flanges. Secured on the side wall top flanges are inwardly facing longitudinal channels slidably receiving the bottom flanges of the outwardly facing channels of the frame. At least one removable stop pin is provided which is engageable through the rear end portion of the longitudinal plates and through the subjacent rear end portion of the truck body wall flange to hold the cover assembly in place but which can be easily removed to allow the cover assembly to slide rearwardly when desired.

1 Claim, 7 Drawing Figures

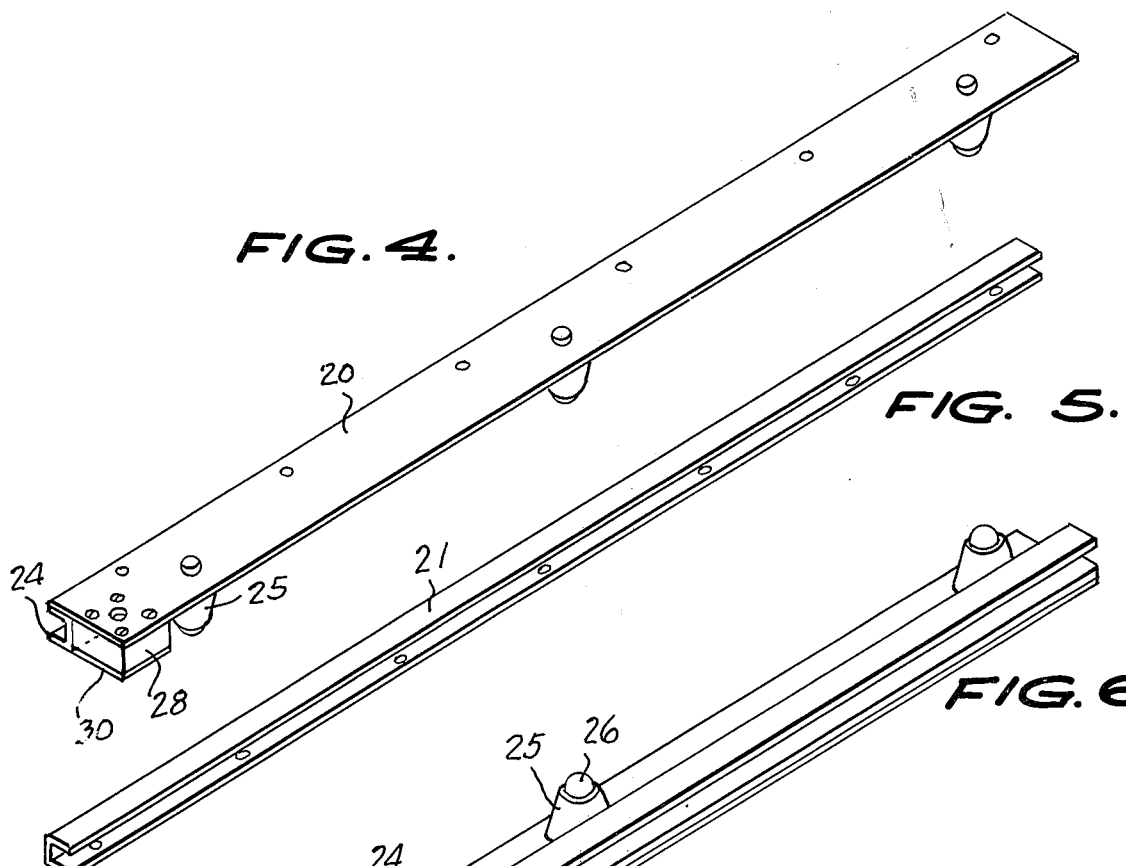
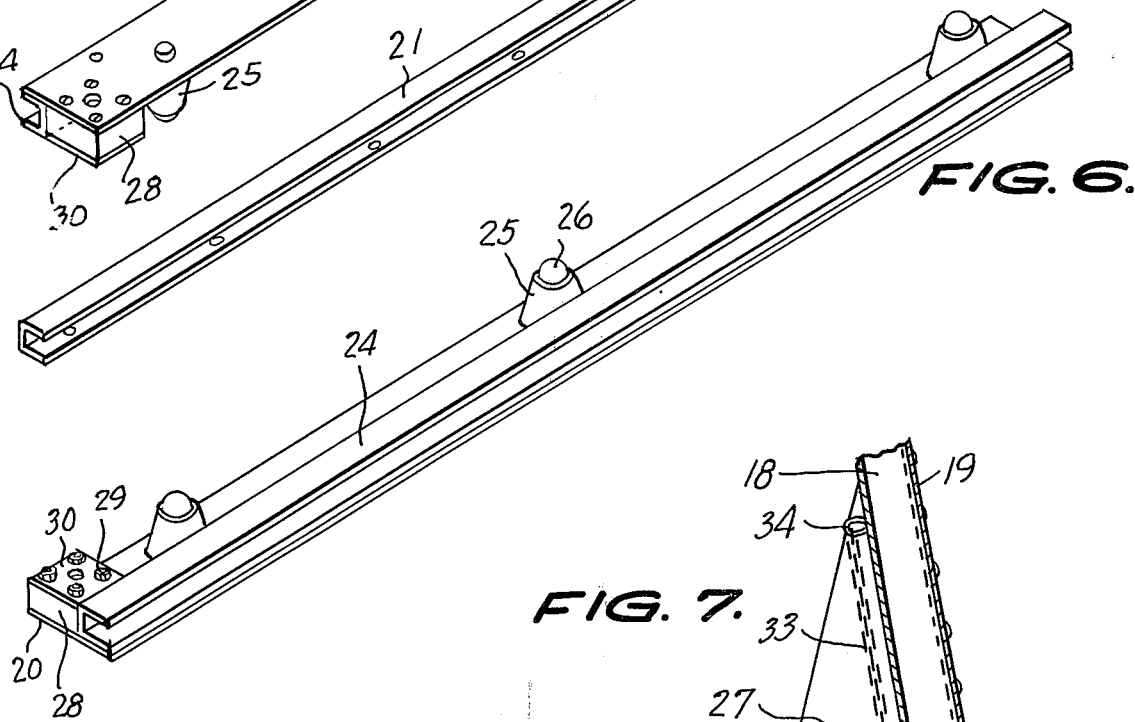
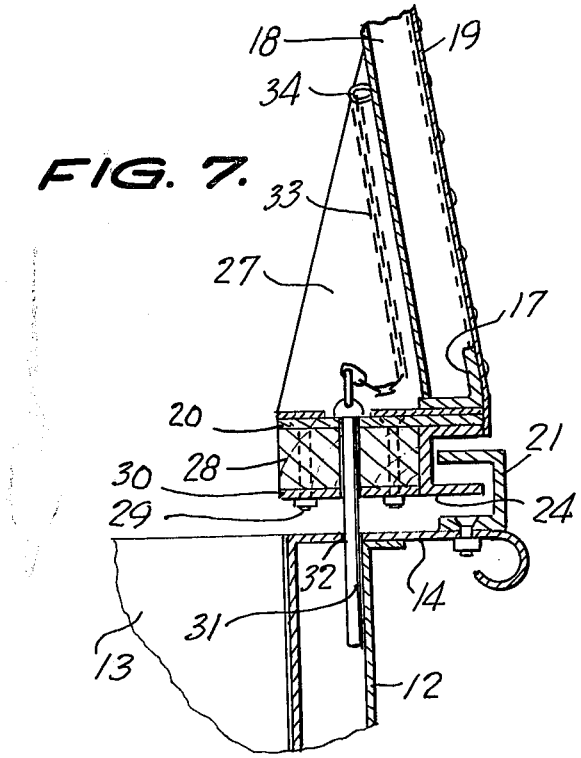

SLIDABLE COVER ASSEMBLY FOR A PICKUP TRUCK

This invention relates to top cover assemblies for pickup trucks, and more particularly to top cover assemblies of the longitudinally slidable type provided with guide track means at the bottom longitudinal side edges of the assembly.

A main object of the invention is to provide a novel and improved slidable top cover assembly for a pickup truck, the assembly being simple in construction, being easy to install on existing standard pickup trucks, and enabling the top cover assembly to easily slide longitudinally as desired when access to the forward portion of the space in the associated truck body is desired.

A further object of the invention is to provide an improved track structure for slidably mounting a top cover assembly on the opposite side walls of a pickup truck, the assembly involving inexpensive parts, being rugged in construction, being mountable on a standard pickup truck with a minimum amount of modification of the truck body, and being provided with removable means for at times retaining the cover assembly in its normal covering position, the means being readily removed to allow the top cover to be slid rearwardly so as to obtain easy access to the forward portion of the truck body.

A still further object of the invention is to provide an improved slidable top cover assembly for a pickup truck wherein the cover assembly is mounted on ball bearings to allow it to be easily moved longitudinally as desired, and the assembly having improved track means which can be readily installed on a standard pickup truck body.

Further objects and advantages of the invention will become apparent from the following description and claims, and from the accompanying drawings wherein:

FIG. 4 is an enlarged perspective view showing one of the longitudinal horizontal plate members and associated parts secured thereto, forming part of the slidable cover assembly of FIG. 1.

FIG. 5 is a perspective view of one of the inwardly facing channel members cooperating with the structure of FIG. 4, and also forming part of the side wall cover assembly illustrated in FIG. 1.

FIG. 6 is a perspective view of the structure shown in FIG. 4, but shown in inverted position.

FIG. 7 is a fragmentary cross-sectional view taken substantially on line 7—7 of FIG. 3.

Figure 2:
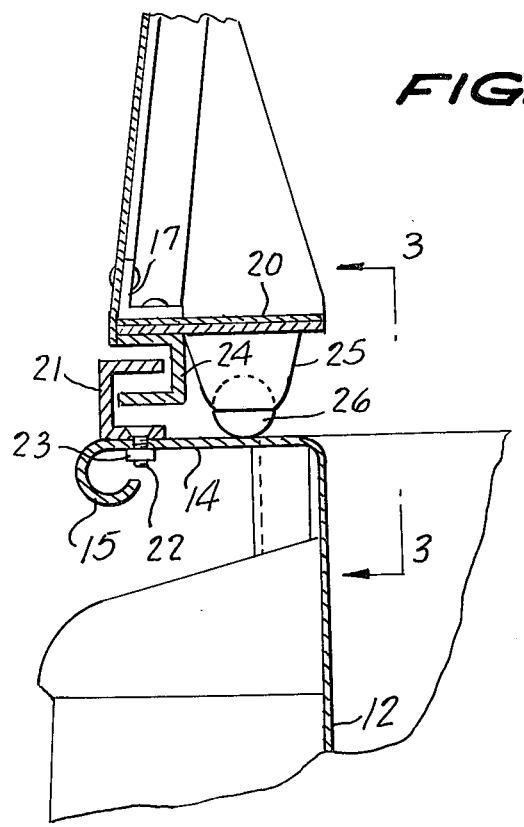
FIG. 2 is an enlarged fragmentary transverse vertical cross-sectional view taken substantially on the line 2—2 of FIG. 1.
Figure 3:
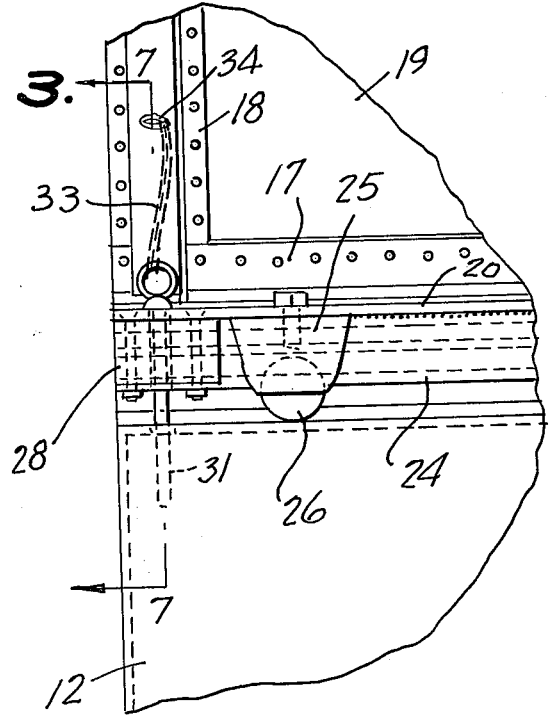
FIG. 3 is a fragmentary elevational view taken substantially on line 3—3 of FIG. 2.

Referring to the drawings, 11 generally designates a conventional pickup truck of the type having a body with longitudinal side walls 12, 12 and a transverse rear end wall 13. The side walls 12 are provided with outwardly extending top flanges 14 having the outer generally circularly formed downwardly rolled edge portions 15, as shown in FIG. 2.

Designated generally at 16 is a cover assembly comprising longitudinally extending bottom angle bars 17 to which are rigidly secured a plurality of spaced arched transverse frame members 18, and suitably secured over the arched frame members 18 is a flexible cover 19 which may comprise canvas or any other suitable flexible material.

Rigidly secured to the bottom flanges of the longitudinal angle bars 17 are respective longitudinal inwardly projecting horizontal plate members 20, 20 which are coextensive in length with the angle bars 17, 17.

Secured on the outer marginal portions of the flanges 14 and facing inwardly are respective longitudinally extending channel bars 21, 21.

The channel bars 21 may be secured to the outer portions of the flanges 14 in any suitable manner, for example, by the use of bolts 22, preferably of the countersunk type, as shown in FIG. 2, the bolts engaging through the bottom flanges of the channel members 21 and passing through the flanges 14, being provided with suitable fastening nuts 23. Rigidly secured to the bottom surfaces of the outer marginal portions of the plate members 20 are respective outwardly facing channel bars 24, 24 which receive the upper flanges of the channel bars 21, in the manner illustrated in FIG. 2, to provide sliding interengagement with said channel bars 21. Secured to the bottom surfaces of the longitudinal plate members 20 inwardly adjacent to the outwardly facing channel bars 24 are spaced depending ball bearing assemblies 25 provided with bottom rotatable contact balls 26 which supportingly engage on the truck flanges 14 so as to slidably support the cover assembly 16 on said flanges. Any suitable number of spaced depending ball bearing assemblies 25 may be provided, the number being sufficient to provide adequate sliding support of the cover assembly 16 on the flanges 14.

The rear transverse frame member 18 may be suitably braced at its ends to the end portions of the plate members 20 by the provision of triangular gusset plates 27 in the corners defined between the ends of the member 18 and the plates 20, as shown in FIG. 7.

Clampingly secured to the bottom surfaces of the ends of the plate members 20 are respective spacer blocks 28, secured by means of bolts 29 and provided with bottom washer plates 30, as shown in FIG. 7. Locking pins 31 are engageable through apertures provided therefor in the members 20, 28 and 30, in the manner illustrated in FIG. 7, the pins 31 being engageable in apertures 32 provided therefor in the end portions of the flanges 14, whereby to lock the cover assembly 16 in its normal covering position overlying the truck bed. By removing the pins 31, the cover assembly 16 may be released so that it can be slid rearwardly for removal, or for providing access to the forward portion of the truck bed from the respective sides thereof, as desired. The locking pins 31 are fastened by chain 33 to attachment eye loops 34 secured to the end portions of the rearward frame member 18, as shown in FIG. 7.

As will be readily apparent, the only modifications required on the standard pickup truck body above described for installing the cover assembly are the drilling operations required for providing the holes to receive the various fastening bolts 22 and the locking pins 31. The components of the cover assembly 16 may be marketed in kit form for assembly by the purchaser and for subsequent mounting on a pickup truck 11 of the type illustrated in FIG. 1.

Stop pins 31 may be provided either at both sides of the assembly, or alternatively, only at one side thereof, since actually only one stop pin 31 is necessary to lock the cover assembly 16 against rearward sliding movement relative to the pickup truck body.

Figure 1:
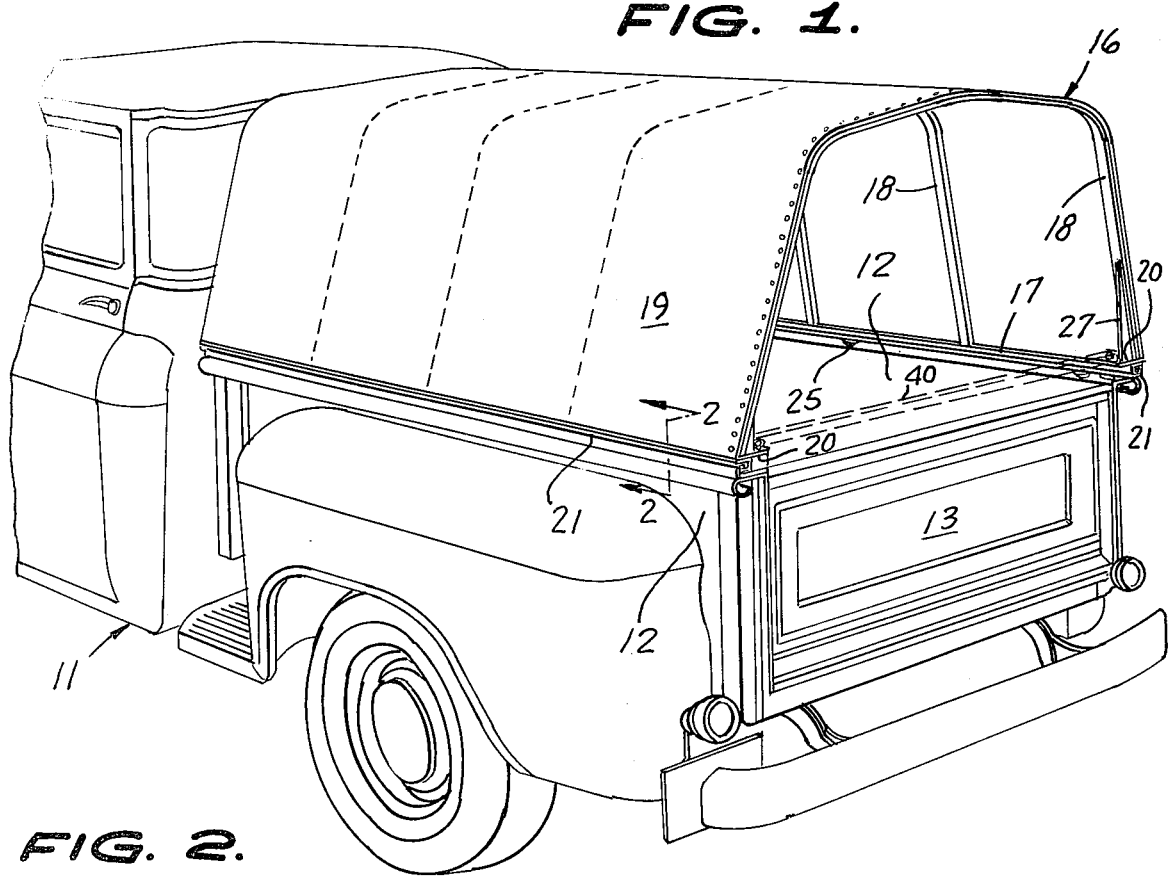
FIG. 1 is a fragmentary rear perspective view of a pickup truck provided with an improved slidable top cover assembly constructed in accordance with the present invention.

A transversely extending tie bar 40 may be secured between the end portions of the cover frame, as shown in dotted view in FIG. 1 to prevent excessive distortion of the frame and to maintain the channel bars 24 properly interengaged with the truck-mounted channel bars 21.

While a specific embodiment of an improved slidable cover assembly for a pickup truck has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a pickup truck having a cab and an open top truck body of substantially lower height than said cab, said truck body having upstanding opposed longitudinal sides with outwardly extending top flanges, a cover assembly comprising a rigid, arched framework consisting of a plurality of bowed members and flexible sheet material overlying and secured on said framework, said cover assembly overlying the truck body and extending to a height equal to that of said cab, a pair of longitudinal bottom plate members secured to said framework and located to overlie said top flanges of the truck side walls substantially in parallelism therewith and substantially of equal length with said side walls, respective longitudinal lower channel bars, having U-shaped cross sections turned with the open sides positioned and facing inwardly towards the center of the body and being secured on the outer portions of said top flanges, respective upper channel bars, having U-shaped cross sections turned with the open sides facing outwardly away from the center of the body and being removably secured to the bottom surfaces of said plate members near the outer edges thereof and having bottom flanges received in the openings of said lower channel bars, and respective depending anti-friction means secured to the bottom surfaces of said plate members and being supportably engaged on said top flanges, said bearing means comprising a plurality of spaced ball bearing assemblies secured to and depending from the plate members inwardly of and adjacent to said upper channel bars, each of said ball bearing assemblies including an inverted conical housing with a ball bearing retained in an opening in the bottom of the inverted housing, at least one apertured block member releasibly secured to and beneath a rear end portion of said plate members and secured inwardly of the upper cannel bar, and a fastening pin engageable through said apertured block member and a subjacent apertured portion of the truck body to lockingly hold the cover assembly in forward position against said cab, said fastening pin being removable from said apertured block member to permit said cover assembly to be moved rearwardly away from said cab, and chain means fastened to said cover assembly at one end and to said fastening pin at the other end to prevent loss of said fastening pin when it is removed from fastening position in the apertured block member.

* * * * *